United States Patent [19]
Schumacher et al.

[11] 3,725,633
[45] Apr. 3, 1973

[54] CORPUSCULAR BEAM IN THE ATMOSPHERE

[75] Inventors: Berthold W. Schumacher, Pittsburgh; Robert E. LaCroix, Monroeville, both of Pa.

[73] Assignee: Westinghouse Electric Corporation, Pittsburgh, Pa.

[22] Filed: Jan. 8, 1971

[21] Appl. No.: 105,113

Related U.S. Application Data

[63] Continuation of Ser. No. 756,654, Aug. 30, 1968, abandoned.

[52] U.S. Cl. ............................................219/121 EB
[51] Int. Cl. .............................................B23k 15/00
[58] Field of Search ......219/121 EB, 121 EA, 121 R, 219/121 P

[56] References Cited

UNITED STATES PATENTS

| | | |
|---|---|---|
| 3,444,350 | 5/1969 | Niedzielski et al. ............219/121 EB |
| 3,271,556 | 9/1966 | Harris............................219/121 EB |
| 2,899,556 | 8/1956 | Schopper et al.................250/49.5 |
| 3,156,811 | 11/1964 | Barry..................................219/121 |
| 3,393,289 | 7/1968 | Duhamel et al. ..................219/121 |
| 3,594,609 | 7/1971 | Vas....................................219/121 P |
| 3,428,776 | 2/1969 | Stauffer.............................219/121 |

FOREIGN PATENTS OR APPLICATIONS

| | | |
|---|---|---|
| 1,010,307 | 11/1965 | Great Britain....................219/121 |

*Primary Examiner*—J. V. Truhe
*Assistant Examiner*—Gale R. Peterson
*Attorney*—A. T. Stratton, C. L. Freedman and J. L. Stoughton

[57] ABSTRACT

Apparatus is disclosed for producing a corpuscular beam in the atmosphere with which the beam may be caused to impinge deeply within the work, for example in cutting rocks. The apparatus has a small diameter for a substantial distance from the beam-exit aperture and produces a low pressure between the aperture and the reaction zone of the beam and the work so that the beam is relatively unscattered over a substantial distance. This desideratum is achieved by transmitting one or more fluids along the beam as it emerges from the aperture producing a jet-or-ejector-type pump action in the region where the beam emerges. The fluids may include a burnable fluid and oxygen which is ignited at the aperture. The heat produced by the burning further reduces the pressure between the aperture and the zone of reaction.

14 Claims, 6 Drawing Figures

CORPUSCULAR BEAM IN THE ATMOSPHERE

This application is a continuation of copending application Ser. No. 756,654 filed Aug. 30, 1968, now abandoned.

CROSS REFERENCE TO RELATED APPLICATION

This invention relates to application Ser. No. 756,653, filed Aug. 30, 1968 to Berthold W. Schumacher and William E. Shoupp and assigned to Westinghouse Electric Corporation. In the Schumacher-Shoupp Application a method is disclosed for cutting, disintegrating or fracturing rocks with a corpuscular beam, which is projected into the atmosphere, particularly for excavating, tunneling and blasting. The techniques of this method are also applicable to cutting glass and other hard materials such as metals, ceramics, quartz or ceramic filled epoxy resins and the like. The Schumacher-Shoupp Application is incorporated herein by reference.

BACKGROUND OF THE INVENTION

This invention relates to corpuscular apparatus in which a corpuscular beam is projected into the atmosphere and has particular relationship to such apparatus for cutting rocks and the like as taught by the Schumacher-Shoupp Application. Typically the Schumacher-Shoupp invention is practiced with apparatus as disclosed in Schopper et al. U.S. Pat. No. 2,899,556 or with apparatus as disclosed generally in Barry U.S. Pat. No. 3,156,811. While such practice of the Schumacher-Shoupp method has proved highly successful, experience has demonstrated that the effectiveness of the method is materially improved by deep penetration of the corpuscular beam into the work being cut, fractured or disintegrated, and it is an object of this invention to effect this improvement.

In the case of Schopper, the beam-transfer section to the atmosphere consists of differentially pumped intermediate chambers separated by walls with small orifices through which the beam passes from one chamber to the next and finally into the atmosphere. The beam-exit orifice to the atmosphere is located in a plate which is typically of about 4 inches in diameter. Connected to the pumping chamber behind the beam-exit to the atmosphere is typically a vacuum-pump line which has a cross section of roughly 2½" × 1". This large cross section of the pump line is necessary for an efficient evacuation of the first differentially pumped chamber against the influx of gas from the beam-exit orifice to the atmosphere. With a smaller pump line efficient evacuation cannot be effected. As a result of these requirements the head section of the Schopper apparatus has an overall size of at least 5 to 6 inches in diameter. For sacrifice of some of the pumping efficiency a pump line concentric to the beam-exit orifice can be provided, but the minimum diameter for the beam-exit system still remains more than 2 inches. The total length of concentrically pumped-beam-exit array cannot exceed one or two feet without a substantial increase in diameter.

Barry discloses apparatus for projecting an electron-beam into the atmosphere which includes a channel (FIG. 2) through which a sealing stream of gas is projected towards the work together with the electron beam. The Barry apparatus has a snub exit configuration like the Schopper apparatus. In addition, the sealing beam is projected as a series of supersonic shock waves which have a compression node at the exit orifice to the atmosphere. The snub nose of Barry militates against impingement of the beam deep into the work. The compressed sealing gas across the exit orifice scatters the beam so that a sharp beam cannot be projected deep into the work.

It is an object of this invention to overcome the above-described disadvantages of the prior art and to provide corpuscular-beam apparatus, for projecting a beam into the atmosphere, which apparatus shall have so small a diameter, and so great a length, at, and extending from, the beam-exit orifice to the atmosphere, and shall project so sharp a beam, as to lend itself readily to operation in cutting, disintegrating, or fracturing work within the work at substantial depth below the surface where the apparatus is injected into the work.

SUMMARY OF THE INVENTION

In accordance with this invention apparatus is provided in which a stream of fluid is transmitted at a high speed along the beam as it emerges into the atmosphere from the beam-exit aperture. This fluid produces a jet-pump or ejector-pump action at the aperture. The stream of fluid sucks the gas at, and around, the aperture creating a substantial partial vacuum through which the corpuscular beam passes with only a minimum of attenuation. The beam-exit structure consists of a tube through which the beam passes which is encircled by one or more annular channels through which the fluid passes. The tube and fluid channels together may have a diameter of as low as one-half inch. Within this structure the beam passes through a drift space which may have a length of several feet without increase in diameter. This structure may be injected throughout its length into an opening in the work which may be initially bored by the beam and which may have a cross section not substantially greater than ½ to 2 square inch.

A satisfactory fluid for the practice of this invention is water. Typically the water is supplied at the rate 0.1 to 10 liters per second at a pressure of 1 to 5 atmospheres above atmospheric. Where the fluid channels are concentric the inner fluid may be steam at pressure of 0.2 to 10 atmospheres above atmospheric and supplied at the rate of 0.05 to 1 pound per second. The outer fluid may be water supplied as specified above. The inner fluid may also be a burnable material, such as methane, acetylene, ethylene, gasoline, hydrogen, and the outer fluid oxygen. In this case the material is ignited and not only reduces the pressure at the exit aperture by jet-pump action but also heats the gas to reduce the pressure. The fluid may also be an electrical plasma gas.

BRIEF DESCRIPTION OF THE DRAWINGS

For a better understanding of this invention, both as to its organization and as to its method of operation, together with additional objects and advantages thereof, reference is made to the following description taken in connection with the accompanying drawings, in which.

DESCRIPTION OF EMBODIMENTS

Figure 1:
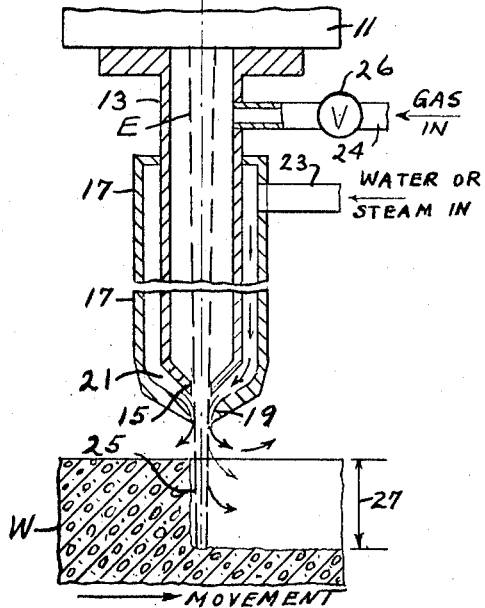
FIG. 1 is a view in longitudinal section, partly generally diagrammatic, showing an embodiment of this invention.

The apparatus shown in FIG. 1 is apparatus for producing a corpuscular beam E which passes into the atmosphere and impinges on work W. The work may be a rocky formation to be cut, disintegrated or fractured. The beam E is shown highly enlarged.

This apparatus includes a beam generator 11 which may be typically a conventional generator of an electron beam. The generator 11 is in communication with a central tube 13, which may be composed of copper or tungsten or the like, through the center of which the beam passes. The tube 13 terminates in a nozzle, aperture or orifice 15 through which the beam E emerges into the atmosphere. The tube 15 is encircled or enclosed in an annular tube or channel 17, which may be composed of steel or iron, for magnetic shielding, and which terminates in a nozzle, aperture or orifice 19 that extends beyond the orifice 15. The conical space 21 between the orifice 15 and the inner surface of the orifice 19 is constricted to produce a jet effect.

Water or steam is supplied from an inlet tube 23 through the channel 17. As mentioned the water may be supplied at about the rate of 0.1 to 10 liters per second and at pressures of about 1 to 5 atmospheres above atmospheric; steam is supplied at the rate of about 0.05 to 1 pound per second and at pressures of about 0.2 to 10 atmospheres above atmospheric. The steam or water jet produces a partial vacuum in the region between the orifice aperture 15 and the work W and also maintains a partial vacuum within tube 13. To suppress any tendency of air from the atmosphere to feed back into the tube 13 a gas, typically an inert gas, is admitted through tube 24. This gas is controlled by needle valve 26. The cutting front 25 of the beam E into the work W is elongated by reason of the partial vacuum between the aperture 15 and the zone of reaction of the beam E and work W. In addition the overall cross section of the tube 13 and channel 17 is small and it may be inserted into the work W. A cut which is 27 ⅛ inches to ½ inch wide may be produced. Where water is used the water jet drives or washes out the debris and other products of the operation at the zone of reaction.

With water flowing through the channel 17 the jet pump action which produces the partial vacuum results from the outflow of the water through constricted region 19. The orifice 19 is located in the conical end section of the outer channel 17. The inner tube 13 is also conically tapered at the end, with the orifice 15 in the tip of the cone. Because of the tapered shape of the apertures or orifices 13 and 19, the channel for the water flow becomes narrower in the area of the cones. Therefore the flow speed of the water increases, and a high speed jet of water emerges through orifice 19. This high speed jet of water prevents atmospheric air from entering 19. At the back of the flow lines of the water, orifice 15 is feeding into a region of low pressure, because the water molecules have all a considerable speed downwardly. In fact, the water jet exerts the same pumping action on orifice 15 as it would around its circumference in a conventional water jet vacuum pump. Obviously a semi-vacuum is created inside the inner tube. The vacuum level to which the inner tube will be evacuated depends of course on the particular properties of the water jet stream. With cold water a vacuum of the order of 15 to 20 Torr can be reached.

Higher vacua can be attained if steam is ejected through the pump instead of water.

When operating the device shown in FIG. 1 with steam a semi-vacuum in the inner tube in the order of 1 Torr or less can be achieved. The semi-vacuum in the inner tube can be maintained at a definite level by gas fed in through the line 24, needle valve 26 which permits adjustment of the influx of gas.

The apparatus shown in FIG. 1 can be built with a very small overall diameter. For instance the inner tube 13 needs to have an inner diameter just wide enough for the passage of the corpuscular beam E. This may be as low as one-eighth inch. The diameter of the outer channel 17 may then be held to a diameter of the order of one-half inch. Since the pumping action by the water jet or steam jet takes place at the lower end of the inner tube 13 no gas flow takes place through the inner tube, therefore its diameter does not have to be dimensioned to accommodate a gas flow. This is a different situation from the one which is encountered in a beam transfer system with concentrically arranged pumping ducts.

In the semi-vacuum inside the inner tube the beam E can travel considerable distances without being attenuated unduly. In view of the small but unavoidable scattering of the particles to the walls of the inner tube 13 it is advisable to make the inner tube of a heat resistant material with good thermal conductivity, for instance cooper or tungsten. Tungsten-plated cooper tube or tantalum or molybdenum can be used for better corrosion resistance. It is additionally advantageous that the inner tube is cooled by the water or steam flowing in channel 17. Because of this cooling the tube 13 and channel 17 can be made much longer than without this cooling action.

Figure 2:
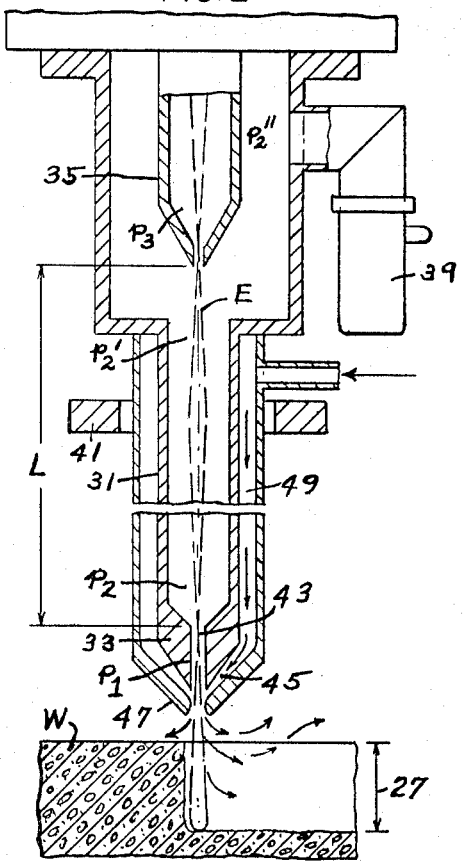
FIGS. 2, 3, 4, 5 and 6 are like views showing modifications of this invention.

The principal feature of the apparatus shown in FIG. 2 is that the inner tube 31 has a capillary orifice 33 through which the beam E passes to the work W. The beam passes through corpuscle-gun nozzle 35 in a chamber 37 which is maintained evacuated by a pumping system 39. The tube 31 is in communication with chamber 37 and passes the beam E. The beam E is focused by lens 41 so that it has a focal point 43 within the capillary orifice 33. The apparatus includes an annular channel 49 encircling tube 31 through which water, steam, air or other fluid is transmitted producing a jet-pump action in the constricted conical region 45 between the orifices 33 and 47.

Typically this capillary orifice 33 can have a diameter of between 40 and 80 mils and a length of between ½ inch to 2 inches. With a water or steam jet operating against the atmospheric pressure a reduced pressure $p_1$ exists in the capillary. Typically the wider part of tube 31 may have a diameter of one-half inch. At its upper end it is connected to the chamber 37. The action of the pump 39 reduces the pressure in the wider portion of the inner tube 31 to a magnitude $p_2$ at its lower end, and a pressure $p_2'$ at its upper end, and a pressure $p_2''$ at the connection to the vacuum pump. Pressure $p_2$ is undesirably lower than $p_1$ because of the flow restriction produced by the narrow capillary at the end of the inner tube 31 unless the pump 39 were to increase the pressure $p_2$.

The region of the beam through the inner tube 31 is described as the drift length L. The pressure along the drift length L is reduced because of the presence of the vacuum pump 39 and because of the presence of the narrow capillary 33 at the lower end of the inner tube 31. The scattering of the beam E along the drift length L is less than it is in the corresponding part of the apparatus of FIG. 1. Whereas the total length of the attenuated part of the apparatus of FIG. 1 is 2 or 3 feet, the apparatus shown in FIG. 2 may have a total drift length L of the order of 6 to 12 feet. An automatic beam alignment system (not shown), but known in the art, may be used to center the beam E in tube 31 and capillary 33.

Figure 3:
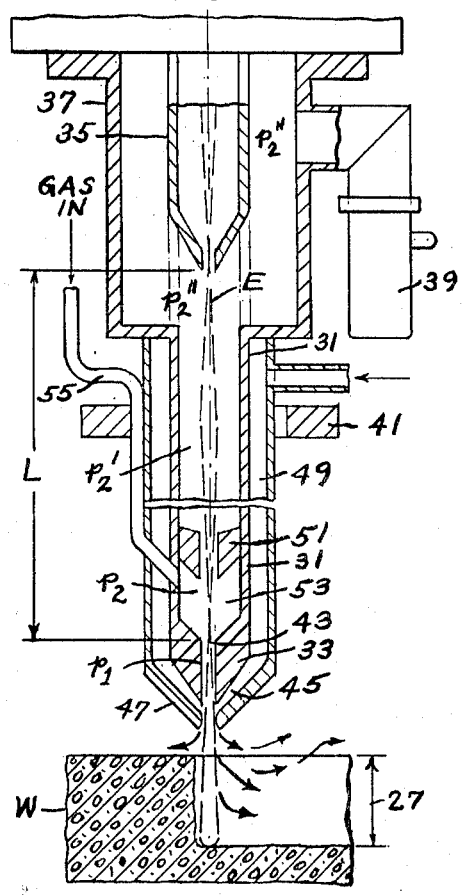

The apparatus shown in FIG. 3 differs from the apparatus shown in FIG. 2 in that it includes a second capillary 51 spaced from the capillary 33 at the orifice. A chamber 53 is defined between capillaries 33 and 51 into which a small quantity of a gas (usually inert gas) is bled through a tube 55.

The second capillary 51 eliminates the disadvantage of the apparatus of FIG. 2 that the pressure $p_2$ (FIG. 2) must be kept higher than the pressure $p_1$ (by throttling the pumps 39 or otherwise). $p_1$ is the ultimate pressure of the aspirator pumping action. If $p_2$ is not appreciably higher than $p_1$, fluid from channel 49 is sucked into the drift space L. The gas bled into chamber 53 assures that the pressure $p_2$ is greater than $p_1$. This structure also assures a well defined gas composition in chamber 37. There is no water vapor in chamber 37.

Figure 4:
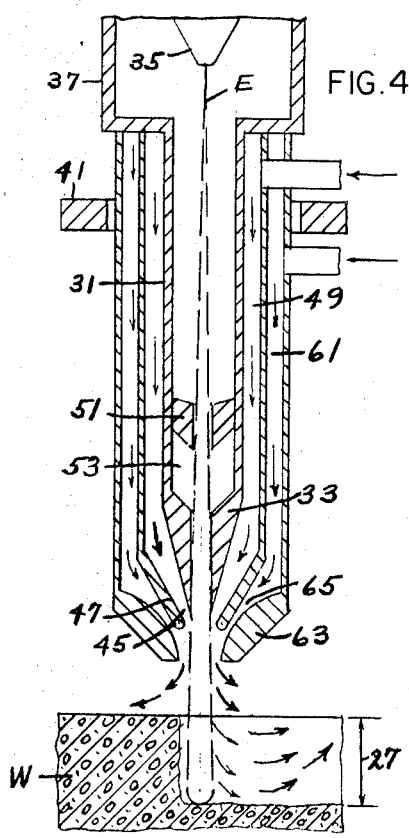

The apparatus shown in FIG. 4 differs from the apparatus shown in FIG. 3 in that a second annular channel 61 encircles the channel 49. The second channel 61 terminates in a conical nozzle 63 and there is a constricted conical space 65 between the nozzle 63 and the nozzle 45. Typically, water is supplied to the outer annular channel 61 at the above-described pressure and speed ranges and steam to the inner channel 49 at the above-described pressure and speed ranges.

The water jet operates against atmospheric pressure having in its rear wake a pressure of the order of 20 Torr. The steam jet operates against the rear pressure in the water jet, the just mentioned 20 Torr, and therefore is more efficient in pumping gas from the inner tube 31; the pressure $p_1$ in the lower end of the inner tube may typically be reduced from a few Torr with a single stage steam jet (FIG. 3) to a pressure of less than 0.1 Torr with this dual jet system. The steam from the inner jet mixes with the water from the outer jet without causing any problems. Care must be exercised that the water of the outer jet flowing concentric to the steam of the inner jet does not cool the passage of the steam to a degree that results in condensation. This can be avoided by providing sufficient thermal insulation (not shown) between the channels 49 and 61.

Figure 5:
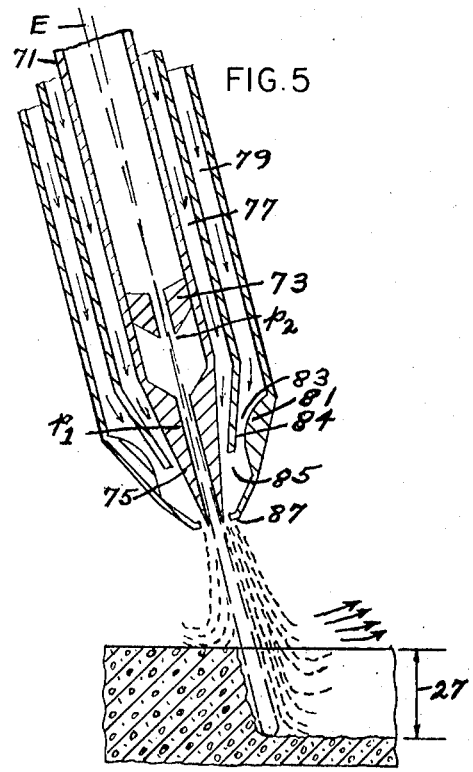

In the apparatus shown in FIG. 5, the partial vacuum is produced by a moving burning gas as in an acetylene torch. This apparatus includes an inner tube 71 through which the beam E passes and which includes capillary sections 73 and 75 as in FIGS. 3 and 4. The inner tube is encircled or enclosed by coaxial annular channels 77 and 79. A fuel, for example, methane, hydrogen, alcohol, gasoline, acetylene, is transmitted through inner channel 77 and oxygen, in liquid or gaseous form, or air, is transmitted through outer channel 79. The outer channel 79 is provided with a reentrant section 81 which forms a constriction 83 with the conical orifice 84 of channel 77. The reentrant section 81 terminates in a mixing chamber 85 where the fuel and oxygen are mixed. The fuel is ignited as it passes out of the chamber 85 producing, by jet-pump action, a vacuum between the orifice and the zone of reaction. The vacuum is improved by the heating produced by the flame. The corpuscular beam E passing out of the apparatus is long and penetrating.

The rapid expansion of the gas in the burning process produces an effective jet flame which emerges from the nozzle 87. If the flow speed of the gases; that is, feeding gas pressures are adjusted properly, the gas in the mixing chamber 85 has a flow downwardly and out of the nozzle, and the flame burns outwardly but not backwards into the inner tube. Use is made of the burning action, and the expansion of the gas in the burning action, to get an additional pumping action from the gas, similar to the pumping action in a jet ejector pump. The apparatus may be moved relative to the work W or the work relative to the apparatus in operation. The apparatus is held so that the tube 71 and the channels 77 and 79 (and the beam E) are at a small lead angle relative to the work; that is, lean in the direction of the yet uncut work W, as shown in FIG. 5. The pumping jet in the above-disclosed apparatus can be shaped to produce a powerful, high speed jet outside the nozzle which may be more powerful than needed for the pumping action as such. The hydrodynamic power of this jet can then be used with advantage in support of the cutting action of the corpuscular beam E itself. The jet blows away the material melted by the corpuscular beam, thereby preventing its re-solidification or its interference with the beam-exit nozzles.

The high-pressure water jet, as well as, for instance, a hydrogen/oxygen flame can also be maintained under water. The above-described apparatus is capable of cutting rock under water as well as in air.

Figure 6:
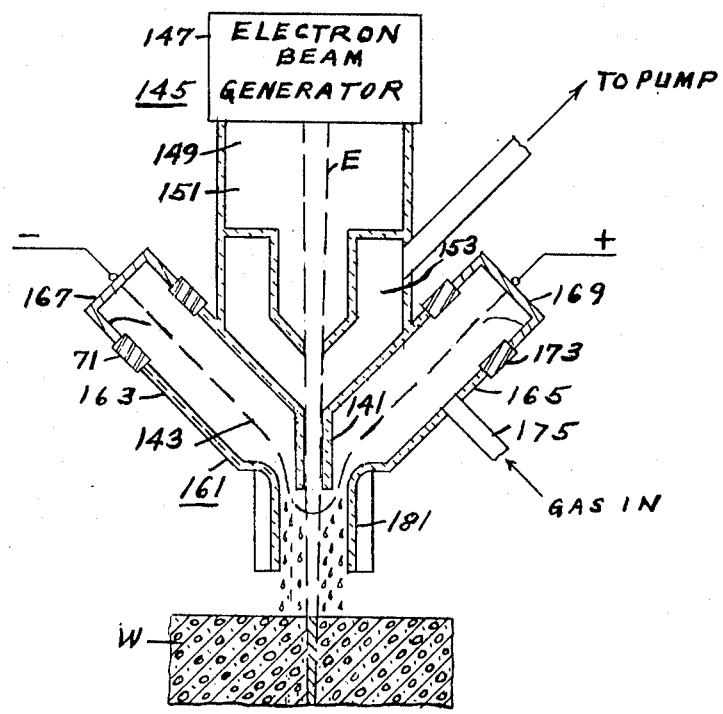

FIG. 6 shows apparatus in which the pumping action is produced, and the gas between the beam outlet nozzle 141 of the apparatus and the work W is attenuated by a plasma flame or plasma jet 143. The plasma jet 143 is produced by apparatus analogous to the Y-plasma torch which is presently being sold by Thermal Dynamics Corporation of Hanover, New Hampshire.

The apparatus shown in FIG. 6 includes apparatus 145 for producing a corpuscular beam E having a stage 147 in which the beam E is generated and an end stage 149 through which the beam E is brought into the atmosphere through differentially pumped chambers 151 and 153. The apparatus includes a Y-shaped plasma generator 161. The torch has hollow arms 163 and 165 terminating in electrodes 167 and 169 respectively between which an arc-producing potential is applied. The electrodes 167 and 169 are insulated from the remainder of the corresponding arms 163 and 165 by rings 171 and 173. A suitable gas under pressure exceeding atmospheric pressure is supplied to arm 165 through a conductor 175. Gas may also be supplied through arm 163. The gas may be inert, for example helium or argon, or nitrogen, or mixtures of these gases with other gases for example argon and hydrogen. The arms 163 and 165 are sealed to the chamber 153 and form part of this chamber.

The stem 181 of the generator 161, which is usually water cooled and is of substantial length, is coaxial with the nozzle 141 and may in fact be the nozzle. The beam E passes through the center of the stem 181 and thus through the plasma 143.

In the use of this apparatus an arc is fired between the electrodes 167 and 169 and its plasma is projected through the stem 181 which serves to constrict the arc. The beam-exit nozzle 141 of the gun 145 projects into the stem 181. The beam E emerges through the stem 181 coaxially with the plasma 143. The plasma rushing out of the nozzle 181 produces jet-pump action and heats the gas between the nozzle 141 and the work W.

While preferred embodiments of this invention have been disclosed herein, many modifications thereof are feasible. This invention is not to be restricted except insofar as is necessitated by the spirit of the prior art.

What is claimed and is desired to be secured by United States Letters Patent is as follows:

1. Apparatus for ejecting a concentrated beam of corpuscles from an evacuated beam supply means into the atmosphere and through a path in the atmosphere to act on work spaced from said supply means, said apparatus comprising, an elongated member having a chamber opening outwardly through one end portion thereof and an end wall at the other end portion thereof, said end wall having an aperture therethrough substantially smaller in area than the cross-sectional area of said chamber through which said beam passes into said path, means for securing said one end portion of said elongated member to said supply means whereby said beam may be transmitted through said chamber and outwardly through said aperture and into said path for impingement on said work, a first fluid transmitting member having a passageway with an inlet adapted to be connected to a source of first fluid under a pressure greater than atmospheric pressure, said fluid transmitting member having a fluid actuated pressure reducing outlet nozzle through which fluid from said passageway is ejected along said path in a concentrated stream against said work, said outlet nozzle being positioned adjacent to said aperture to provide a reduced pressure at the outlet side of said aperture as a consequence of fluid flow through said passageway of said fluid transmitting member and outwardly through said nozzle along said path, said outlet nozzle including an outlet aperture, said outlet aperture of said nozzle being spaced outwardly along the path of said beam from said aperture of said elongated member, said aperture of said elongated member being of substantial length in the direction of the longitudinal axis of said beam and being capillary in cross-section, a second fluid transmitting member having a passageway with an inlet adapted to be connected to a source of second fluid under a pressure greater than atmospheric pressure, said second fluid being a different fluid from said first fluid, said second fluid transmitting member having an outlet nozzle for its said passageway, said outlet nozzle of said second member being positioned adjacent to said outlet nozzle of said first fluid transmitting member and constructed and arranged to provide a reduced pressure at the outlet side of said outlet nozzle of said first member as a consequence of the flow of said second fluid, one of said fluids being water and the other of said fluids being steam.

2. The combination of claim 1 in which said other fluid is said first fluid and said one fluid is said second fluid.

3. Apparatus for transmitting a concentrated beam of corpuscles, said apparatus comprising, an evacuated beam supplying means for supplying and directing a corpuscular beam against work located in the atmosphere and spaced from said supply means, a first elongated hollow-tube having a first end portion through which the hollow elongated interior of said tube opens without substantial restriction, said first tube having a first end wall at its second end portion provided with a first capillary aperture therethrough, means sealing said first end portion of said tube to said supply means in fluid tight relation and in alignment with said beam whereby said beam passes through said interior and outwardly of said tube through said aperture, a second elongated hollow tube having a first end portion thereof surrounding said first tube to provide therewith a first annular passageway and having a second end portion, said second end portion of said second tube being provided with an outlet for the fluid supplied to said fluid supply means, said outlet including a first nozzle aligned with said aperture and through which said beam passes to impinge said work, fluid supply means for supplying fluid into said second tube at a location therein spaced toward said first end portion thereof from said nozzle, a portion of the space between said nozzle and said second end portion of said first elongated tube being constricted to provide a jet effect by fluid flow through said annular chamber and outwardly of said nozzle to reduce the pressure at the outlet side of said first aperture below atmospheric pressure.

4. The combination of claim 3 in which the outer surface of said second end portion of said first tube and the inner surface of said second end portion of said second tube are both conical in shape with the smaller sectional area thereof facing the work, said first aperture being substantially at the apex of the conically shaped surface of said first tube, said nozzle including a second aperture through said conical surface of said second tube.

5. The combination of claim 4 in which said second aperture comprises an elongated capillary aperture having a substantially greater dimension along the length thereof than the dimension transverse to the length.

6. The combination of claim 5 in which said first tube is provided with a transversely extending wall intermediate its said first end wall and its said first end portion, said transversely extending wall being provided with a capillary aperture therethrough aligned with said capillary aperture in said first end wall of said first tube.

7. The combination of claim 6 in which there is provided means for passing steam through said second tube and outwardly of said nozzle.

8. The combination of claim 5 in which there is provided a third elongated hollow tube having a first end portion thereof surrounding said second tube to provide therewith a second annular passageway and having a second end portion, said second end portion of said third tube being provided with a second nozzle through which said beam passes to said work, said second nozzle and said second end portion of said second tube cooperating to provide a jet action by fluid flow through said second annular chamber and outwardly of said second nozzle whereby the pressure at the outlet side of said first nozzle is reduced below atmospheric pressure.

9. The combination of claim 8 in which said tubes are circular in cross-sections, said first tube having a diameter in the order of ½ inch, the length of said first tube is in the order of 6 to 12 feet, and said capillary aperture being in the order of 40 to 80 mils in diameter and of a length in the order of ½ to 2 inches.

10. The combination of claim 9 in which means is provided to flow steam through said first annular chamber and means is provided to flow water through said second annular chamber.

11. Apparatus for producing a corpuscular beam to act on and to deeply penetrate into work located in the atmosphere, said apparatus comprising, means for producing a concentrated beam of corpuscles in an evacuated chamber, an aperture, a path providing means connected in beam-transmitting relationship with said chamber and providing a pathway for transmitting said beam into the atmosphere through said aperture and in acting relationship with said work, said beam acting on said work at a zone of reaction of said beam and work, and fluid flow directing means associated with said pathway and effective to propel a first fluid at a high speed generally along said beam into the atmosphere, said flow directing means including a constriction to reduce the pressure of the fluid along said beam between said aperture and said zone as it passes into and through the atmosphere to said zone, said flow directing means exerting a force on said fluid generally longitudinal of said beam to direct the flow of said fluid generally along said beam, said fluid being water.

12. The apparatus of claim 11 in which the path providing means includes a first channel through which the beam is transmitted, the associated means includes a second channel encircling the first channel through which a second fluid is propelled and a third channel encircling the first channel through which said first fluid is propelled around said second fluid, said first and second fluids being directed along the beam and cooperating to reduce the pressure of the gas along the beam between the aperture and the zone, said second fluid being steam.

13. The apparatus of claim 11 wherein the path providing means includes an elongated drift space for the corpuscular beam between the beam-producing means and the aperture, said drift space having a first capillary channel through which said beam passes, a second capillary between said first capillary channel and said aperture, said capillary channels defining between them a chamber in said drift space, and means for producing a small pressure in said chamber to prevent the injection of fluid by reason of the low pressure at said aperture, into the region of said drift space between said beam-producing means and said first capillary channel, said means for producing said pathway being a long attenuated channel through which the beam passes, said long attenuated channel being of such small cross-sectional dimensions that it may be injected throughout its length into an opening in the work initially bored by the beam itself.

14. The apparatus of claim 13 wherein the channel has a length of several feet.

* * * * *